US010812956B2

(12) United States Patent
Buscemi et al.

(10) Patent No.: US 10,812,956 B2
(45) Date of Patent: Oct. 20, 2020

(54) ELECTRONIC DEVICE ENABLING NFC COMMUNICATION

(71) Applicant: SONY CORPORATION, Tokyo (JP)

(72) Inventors: Meik Buscemi, Reichenbach (DE); Frank Dawidowsky, Stuttgart (DE)

(73) Assignee: SONY CORPORATION, Tokyo (JP)

( * ) Notice: Subject to any disclaimer, the term of this patent is extended or adjusted under 35 U.S.C. 154(b) by 141 days.

(21) Appl. No.: 15/127,199

(22) PCT Filed: Mar. 26, 2015

(86) PCT No.: PCT/EP2015/056500
§ 371 (c)(1),
(2) Date: Sep. 19, 2016

(87) PCT Pub. No.: WO2015/144800
PCT Pub. Date: Oct. 1, 2015

(65) Prior Publication Data
US 2018/0176756 A1 Jun. 21, 2018

(30) Foreign Application Priority Data

Mar. 26, 2014 (EP) ..................................... 14161748

(51) Int. Cl.
*H04B 7/00* (2006.01)
*H04W 4/80* (2018.01)
*H04B 5/00* (2006.01)
*H04W 88/04* (2009.01)

(52) U.S. Cl.
CPC ............ *H04W 4/80* (2018.02); *H04B 5/0031* (2013.01); *H04W 88/04* (2013.01)

(58) Field of Classification Search
CPC ....... H04W 4/80; H04W 88/04; H04B 5/0031
USPC ......................................................... 455/41.2
See application file for complete search history.

(56) References Cited

U.S. PATENT DOCUMENTS

| 7,657,255 B2 * | 2/2010 | Abel .................... H04B 5/0031 |
| | | 455/414.1 |
| 8,606,933 B1 * | 12/2013 | Gossweiler, III ... H04M 1/6066 |
| | | 709/227 |
| 2010/0081375 A1 * | 4/2010 | Rosenblatt .......... H04L 12/2814 |
| | | 455/41.1 |

(Continued)

FOREIGN PATENT DOCUMENTS

| CN | 203086471 U | 7/2013 |
| CN | 203243351 U | 10/2013 |
| WO | WO 2009/026000 A1 | 2/2009 |

OTHER PUBLICATIONS

International Search Report dated Jun. 11, 2015, in PCT/EP2015/056500 filed Mar. 26, 2015.

(Continued)

*Primary Examiner* — April G Gonzales
(74) *Attorney, Agent, or Firm* — Xsensus LLP (57) ABSTRACT

An electronic device includes an NFC unit configured to enable near field communication (NFC) with at least one NFC device, a network communication unit configured to communicate with at least one network device, a controller configured to control the NFC unit and the network communication unit to exchange data between the at least one NFC device and the at least one network device.

18 Claims, 4 Drawing Sheets

(56) References Cited

U.S. PATENT DOCUMENTS

| | | | | |
|---|---|---|---|---|
| 2010/0081385 A1* | 4/2010 | Lin | ............... | H04W 4/80 |
| | | | | 455/41.3 |
| 2010/0082567 A1* | 4/2010 | Rosenblatt | ............ | G06F 16/40 |
| | | | | 707/705 |
| 2011/0319016 A1* | 12/2011 | Gormley | ............ | H04M 1/2757 |
| | | | | 455/41.1 |
| 2013/0181819 A1* | 7/2013 | McLaren | ............ | H04W 4/80 |
| | | | | 340/10.4 |
| 2013/0237148 A1* | 9/2013 | McCann | ............ | H04W 4/80 |
| | | | | 455/41.1 |
| 2013/0247117 A1* | 9/2013 | Yamada | ............ | G08C 17/02 |
| | | | | 725/93 |

OTHER PUBLICATIONS

LG Electronics, Inc., "LG TV Tag on", < https://play.google.com/store/apps/details?id=com.ige.tv.nfcapps>, Retrieved on Aug. 19, 2016, 1 page.

Search Report and Office Action issued in Chinese Application 2015800158395 dated Jul. 3, 2018.

Communication Pursuant to Article 94(3) dated Mar. 11, 2019 in European Application No. 15 713 688.8-1220.

Communication Pursuant to Article 94(3) dated May 9, 2018 in European Application No. 15 713 688.8-1220.

\* cited by examiner

ELECTRONIC DEVICE ENABLING NFC COMMUNICATION

CROSS-REFERENCE TO RELATED APPLICATIONS

The present application claims priority to European Patent Application 14161748.0 filed by the European Patent Office on 26 Mar. 2014, the entire contents of each of which being incorporated herein by reference.

BACKGROUND

Field of the Disclosure

The present disclosure relates to an electronic device, in particular a handheld, portable, near field communication (NFC) device, a network device and corresponding methods.

Description of Related Art

Electronic devices providing NFC technology allow a user to perform a plurality of different actions, such as exchanging contact details, data files or payment information by a simple touch of the portable device to another portable or to a stationary device. To start NFC communication, typically one of the two electronic devices emits an RF (radio frequency) field and polls for the presence of a listening device. The listening device may be a device with activated receiver or a device with a passive transponder technology transmitting data by modulating the RF field transmitted by the polling device.

There are electronic devices on the market, in particular handheld, portable electronic devices such as mobile phones or tablets that support NFC already today. However, other electronic devices do not support NFC, and it is still uncertain if full NFC support will become a mainstream feature for such electronic devices. But many or even most electronic devices nowadays are network-enabled and are capable of exchanging data of generally any type with other network-enabled devices (such network-enabled devices being referred to as "network devices" herein).

In the context of the present disclosure an electronic device providing NFC technology (also referred to as "NFC device") shall be understood as a device that can be either a multi-purpose NFC device that can operate as reader/writer, card or in peer-to-peer mode, or the NFC device may be an NFC tag (either embedded or emulated).

The "background" description provided herein is for the purpose of generally presenting the context of the disclosure. Work of the presently named inventor(s), to the extent it is described in this background section, as well as aspects of the description which may not otherwise qualify as prior art at the time of filing, are neither expressly or impliedly admitted as prior art against the present disclosure.

SUMMARY

It is an object to provide an electronic device and a corresponding NFC communication method by which active read/write (R/W) support can be provided to non-NFC enabled network devices. It is a further object to provide a network device and a corresponding network communication method as well as a corresponding computer program for implementing the disclosed methods and a non-transitory computer-readable recording medium for implementing the disclosed methods.

According to an aspect there is provided an electronic device comprising
an NFC unit configured to enable near field communication, NFC, communication with at least one NFC device,
a network communication unit configured to communicate with at least one network device,
a controller configured to control the NFC unit and the network communication unit to exchange data between the at least one NFC device and the at least one network device.

According to a further aspect there is provided a network device comprising
a network communication unit configured to communicate with other network devices,
a controller configured to control the network communication unit to request an electronic device, which has a network communication unit and which is configured to enable NFC communication with at least one NFC device, to exchange data between at least one NFC device and at least one network device and/or to register at such an electronic device for data exchange with one or more NFC devices, types of NFC devices and/or data carried by NFC devices.

According to still further aspects corresponding methods, a computer program comprising program means for causing a computer to carry out the steps of the method disclosed herein, when said computer program is carried out on a computer, as well as a non-transitory computer-readable recording medium that stores therein a computer program product, which, when executed by a processor, causes the method disclosed herein to be performed are provided.

Preferred embodiments are defined in the dependent claims. It shall be understood that the disclosed devices and methods, the disclosed computer program and the disclosed computer-readable recording medium have similar and/or identical preferred embodiments as the claimed electronic device and as defined in the dependent claims.

One of the aspects of the disclosure is to use the NFC technology provided in an electronic device to enable other devices (network devices), which do not provide NFC technology but are connected to the electronic network via a network (e.g. a WIFI network, IP network or communications network), to make use of services using NFC technology and communicate with other NFC devices. The electronic device thus acts a kind of gateway between one or more network devices and one or more NFC devices.

Many network devices like many consumer electronic devices (e.g. TVs, audio systems, computers, gaming systems, etc.) often do not have any NFC capabilities (sometimes also called NFC functionalities) or only support passive NFC communication capabilities (e.g. by having an embedded NFC tag), so that they may be able to provide data to a reader/writer device, but cannot read from other NFC devices themselves and cannot communicate with other similar devices supporting only passive NFC communication capabilities as well. The disclosed solution thus provides that those network devices indirectly have NFC capabilities, preferably active NFC communication capabilities.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE EMBODIMENTS

Figure 1:
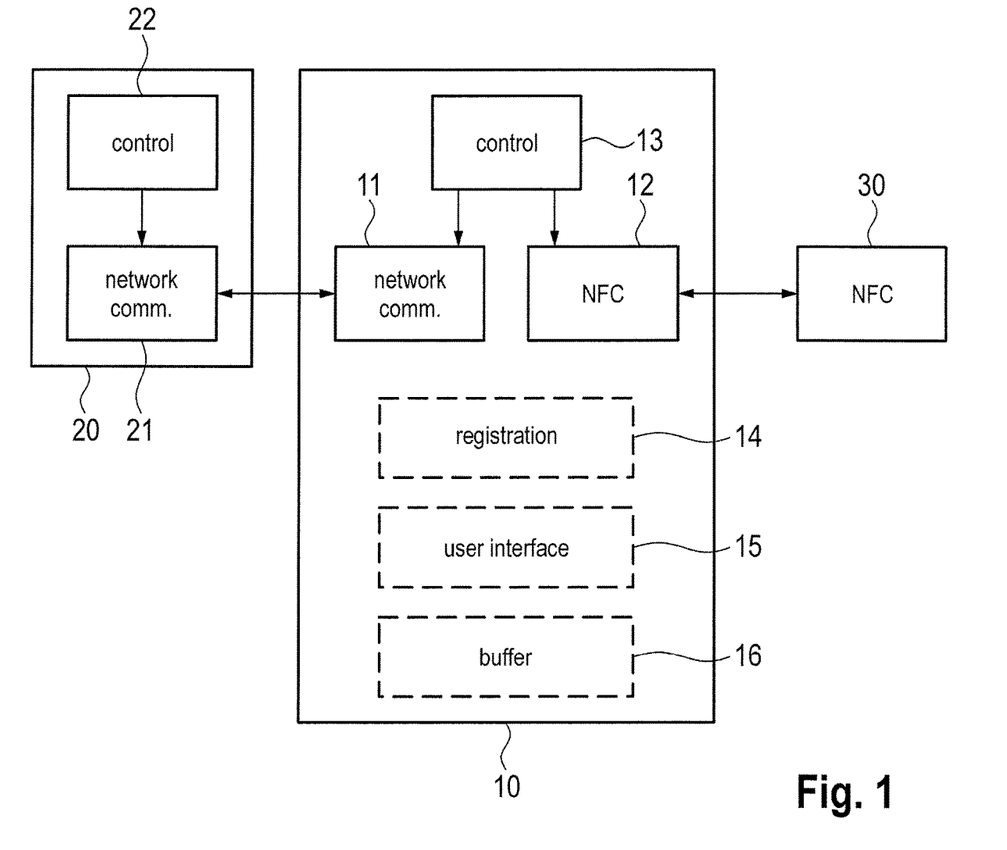
FIG. 1 shows a schematic diagram of the general layout of an electronic device and a network device according to the present disclosure.

Referring now to the drawings, wherein like reference numerals designate identical or corresponding parts throughout the several views, FIG. 1 shows a schematic diagram of the general layout of an electronic device 10 and a network device 20 according to the present disclosure. Further, an NFC device 30 is provided.

Generally, not all devices are NFC enabled, i.e. they have no NFC functionality at all or only have passive NFC functionality, e.g. use passive "NFC tags" that can simply be attached to devices to enable certain use cases. This works for limited use cases, e.g. when NFC is used to connect an accessory to a mobile phone, but poses problems if the device shall be used with other NFC devices that only have passive NFC functionality (e.g. an NFC tag) as well, but have no full (i.e. active) NFC functionality. The network device 20 shall be considered to have no NFC functionality at all or only passive NFC functionality, but not active NFC functionality. Non-limiting examples of network devices may be any consumer electronic devices like a TV set, video recorder, gaming computer, computer, satellite receiver, cable receiver, etc.

Since many devices support network capabilities, NFC data can be exchanged and pushed using network functions. A device having (full) NFC functionality can e.g. offer its NFC capabilities to other devices if network capabilities are supported on both sides. The electronic device 10 shall be considered as such a device that provides its NFC capabilities over the network to the network device 20 (and optionally to other network devices 20, and may, hence, be referred to as "TouchPoint". Non-limiting examples of electronic devices may be a mobile phone, smartphone, laptop, PDA, tablet PC, camera, remote control, portable media player, headset, headphone, wireless speaker, etc.

The NFC device 30 may be any device that has NFC functionality, either passive or active. It may e.g. be an NFC tag, as real hardware element or as software element (e.g. emulated on a device). Non-limiting examples are any kinds of cards, such as smartcards, chipcards, SIM cards, debit cards, credit cards, any kinds of emulations on portable devices, separate NFC tags provided along with other things, like goods purchased or magazines, etc.

The electronic device 10 comprises an NFC unit 11 configured to enable NFC communication with at least one NFC device 30 and a network communication unit 12 configured to communicate with at least one network device 20. A controller 13 is provided that is configured to control the NFC unit 11 and the network communication unit 12 to exchange data between the NFC device 30 and the network device 20.

The network device 20 (e.g. a TV set or gaming computer) comprises a network communication unit 21 configured to communicate with other network devices. Further, a controller 22 is provided that is configured to control the network communication unit 21 to request the electronic device 10 to exchange data between the NFC device 30 and the network device 20 and/or to register at such an electronic device 10 for data exchange with one or more NFC devices 30, types of NFC devices 30 and/or data carried by NFC devices 30.

Optionally, in an embodiment the electronic device 10 further comprises a registration unit 14 configured to enable network devices to register for data exchange with one or more NFC devices, types of NFC devices and/or data carried by NFC devices. In another embodiment the electronic device 10 optionally further comprises a user interface 15 configured to provide requests or information to the user. Still further, in an embodiment the electronic device 10 optionally further comprises a buffer 16 configured to buffer data read from an NFC device while the network is disabled and/or the NFC device is disconnected from the network.

Two exemplary application scenarios shall be differentiated in more detail in the following. In a first application scenario a network device triggers an NFC action, e.g. due to an application request. In a second application scenarios network devices can register for different NFC devices (e.g. NFC tags) and are notified as soon as such an NFC device is read by the electronic device.

Figure 2:
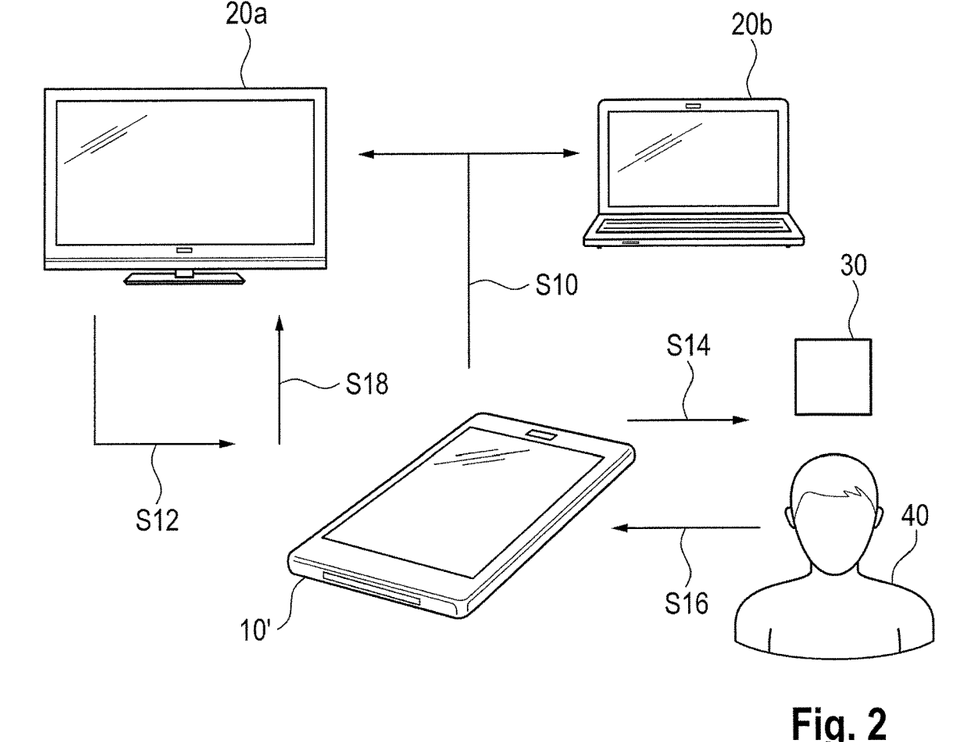
FIG. 2 shows a schematic diagram of a first embodiment of an electronic device and a network device according to the present disclosure.
Figure 3:
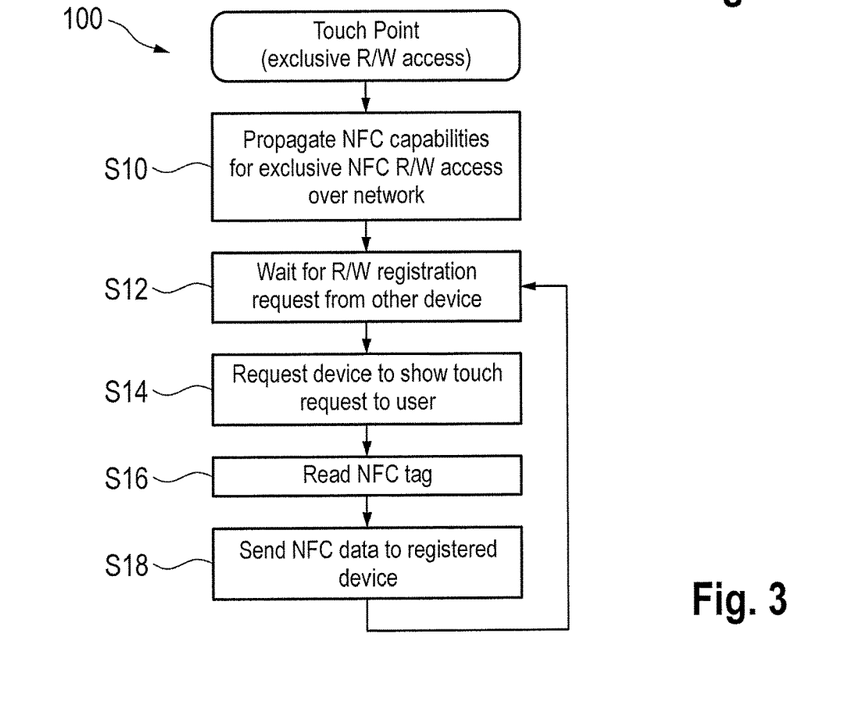
FIG. 3 shows a flow chart of a first embodiment of a method according to the present disclosure.

The first application scenario shall be explained with reference to FIGS. 2 and 3, wherein FIG. 2 shows a schematic diagram of a first embodiment of an electronic device 10' and two network devices 20a, 20b according to the present disclosure and FIG. 3 shows a flow chart of a first embodiment of a method 100 according to the present disclosure. In this application scenario the electronic device 10' is a smartphone comprising at least elements 11-13 and 15, the first network device 20a is a TV set, the second network device 20b is a laptop and the NFC device 30 is an NFC tag.

In a first step S10 the electronic device 10' (i.e. the "TouchPoint") propagates (e.g. "broadcasts", which shall generally be understood herein as "communicating" or "transferring" a message to one or more recipients, preferably simultaneously) its NFC capabilities via the network, e.g. by using of a wireless or wired network, to which the electronic device 10' (and one or more network devices 20a, 20b) are connected. For instance, an UPnP protocol may be used in an IP network. Other potential networks include WIFI, communications networks like UMTS or LTE, cable networks, Bluetooth, Zigbee, etc.

If an application residing on a network (i.e. a non-NFC) device, like the TV set 20a in this example, wants to make use of such NFC functionality of the electronic device, it requests NFC access (in particular RW access) at the electronic device 10' in step S12.

The electronic device 10' receives this request and asks the user 40 in step S14 via its user interface 15 to touch an NFC tag, in particular the NFC tag 30 requested by the network device 20. Additional information about the kind of NFC tag may be shown as well. The user interface 15, which may be a display, keypad, speech recognition unit, etc., is preferably configured to provide a request to the user to read a particular NFC device or a particular type of NFC device, or to provide a confirmation or indication of the data read and/or information about the requesting network device to the user.

In step S16 the user touches the NFC tag 30 to the electronic device 10' (or at least brings it close enough to enable the NFC communication), and the electronic device 10' reads the data from the NFC tag 30.

The data read from the NFC tag 30 is then sent from the electronic device to the requesting network device 20a over the network in step S18. The requesting network device 20a is then able to make use of the received data in the desired application, e.g. use a voucher stored on the NFC tag 30 for downloading a moving from a server. The method then returns to step S12.

Figure 4:
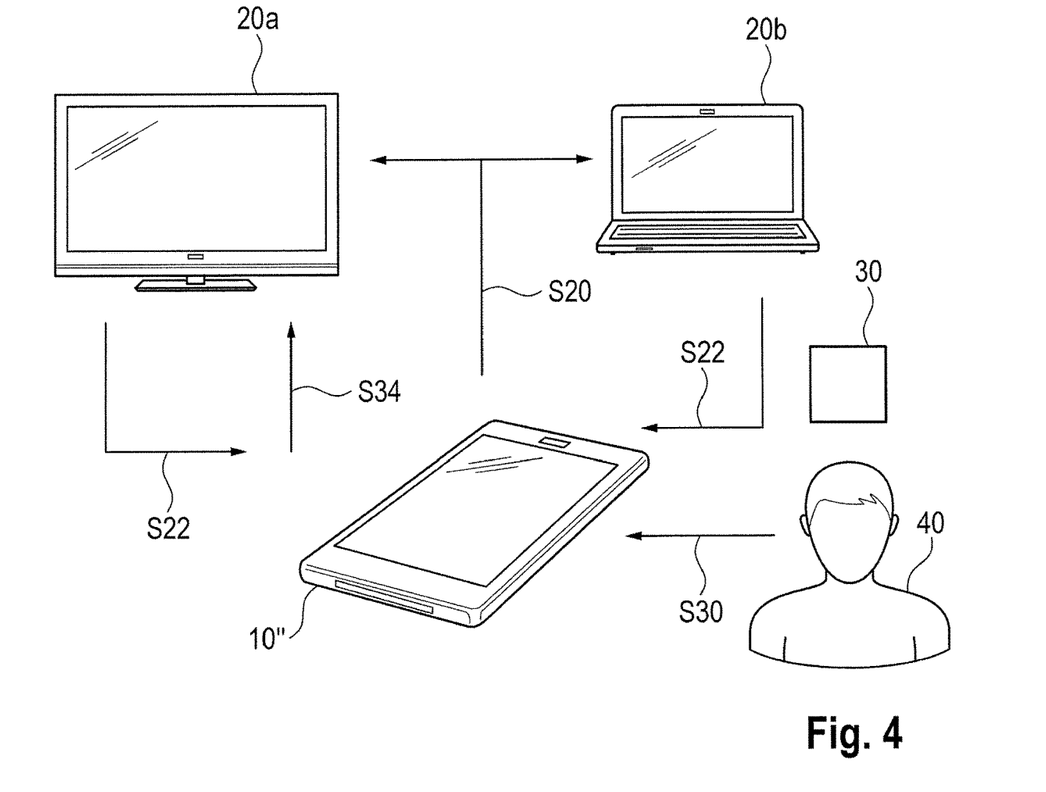
FIG. 4 shows a schematic diagram of a second embodiment of an electronic device and a network device according to the present disclosure.
Figure 5:
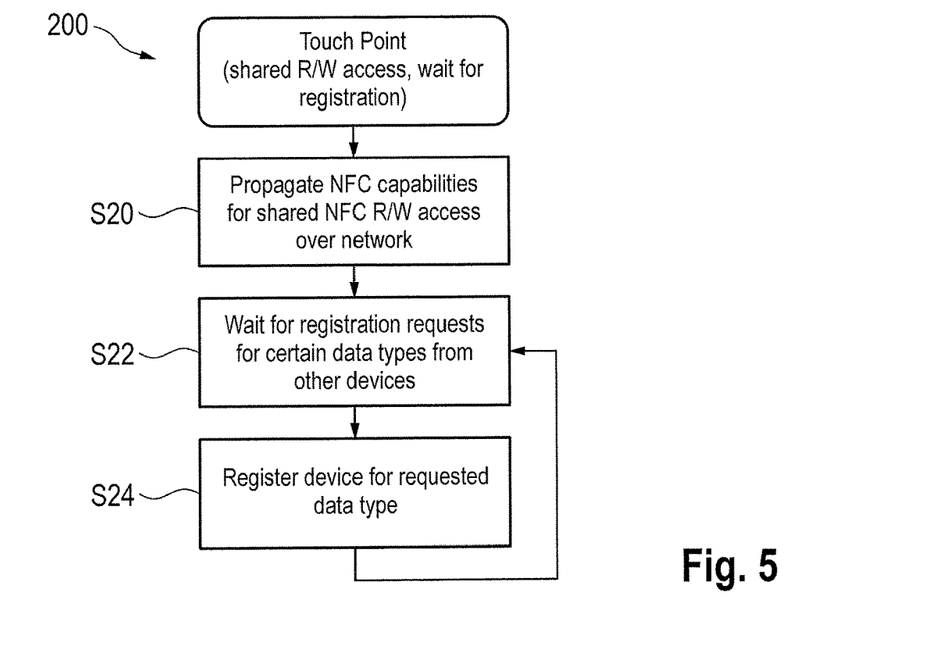
FIG. 5 shows a flow chart of a second embodiment of a method according to the present disclosure.
Figure 6:
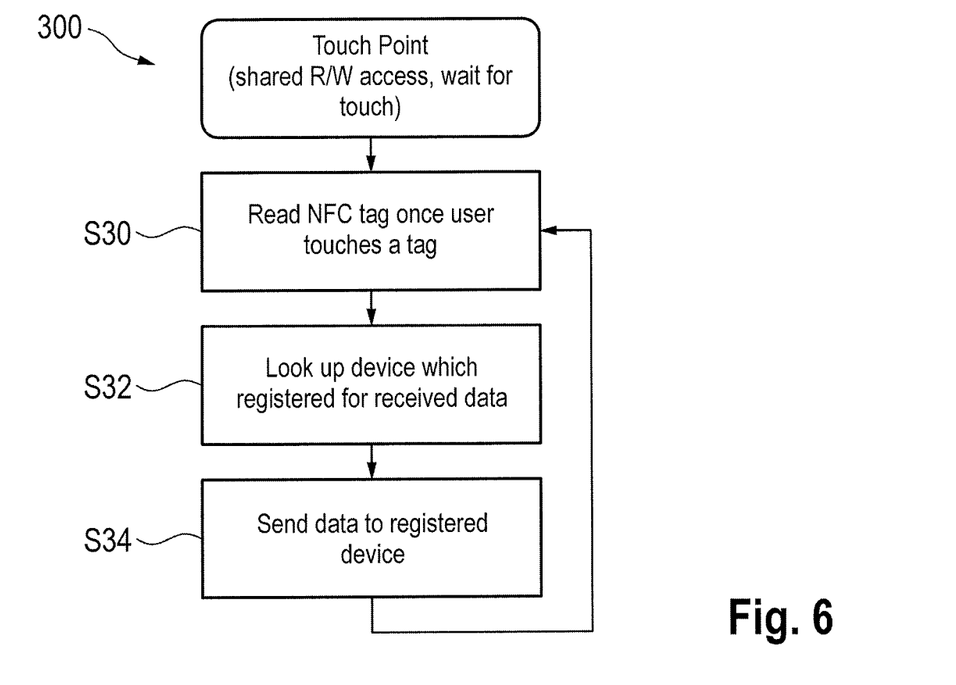
FIG. 6 shows a flow chart of a third embodiment of a method according to the present disclosure.

The second application scenario shall be explained with reference to FIGS. 4 to 6, wherein FIG. 4 shows a schematic diagram of a second embodiment of an electronic device 10" and two network devices 20a, 20b according to the present disclosure, FIG. 5 shows a flow chart of a second embodiment of a method 200 according to the present disclosure and FIG. 6 shows a flow chart of a third embodiment of a method 300 according to the present disclosure. In this application scenario the electronic device 10" is a smartphone comprising at least elements 11-16, the first network device 20a is a TV set, the second network device 20b is a laptop and the NFC device 30 is an NFC tag.

In a first step S20 the electronic device 10" propagates ("broadcasts") its NFC capabilities via the network like in step S10 in the first embodiment. If an application residing on a network (non-NFC) device, here the TV set 20a and the laptop 20b, wants to make use of such NFC functionality, it registers at the electronic device 10" in step S22. In particular, a network device 20a, 20b may register at the registration unit 14 of the electronic device 10 for data exchange with one or more NFC devices, types of NFC devices and/or data carried by NFC devices. For instance, a network device 20a, 20b may provide information to the electronic device 10" about the type of NFC tag the application is interested in. Such information is preferably stored in the registration unit 16, in particular an internal database, to complete the registration in step S24. For instance, it may be registered that the TV set 20a is interested in voucher tags and that the laptop 20b is interested in URL tags.

If at a later point in time, the user touches an NFC tag, i.e. brings the NFC tag and the electronic device 10" in close proximity, the electronic device 10" can read the data from the NFC tag in step S30 and check its database stored in the registration unit 14 in step S32 to see whether there is an application that is interested in such an NFC tag. In particular, the controller 13 of the electronic device 10" then checks, once an NFC device 30 is read by the NFC unit 12, if there is a registration for said NFC device 30, said type of NFC device 30 and/or the data carried by said NFC device 30 at the registration unit 14. For instance, if the user 40 touches a voucher tag the electronic device 10" finds that the TV set 20a registered for such voucher tags.

If this is the case, i.e. if a match was found, the controller 13 controls the network unit 11 and the NFC unit 12 to exchange data between said NFC device 30 and the one or more network devices 20a, 20b, which made said registration, i.e. the tag information is sent to said one or more network devices 20a, 20b in step S34. In the example where a voucher tag is touched, the voucher is sent to the TV set 20a which had registered for the use of such voucher tags.

The data exchanged between the various devices may be considered as "messages". The following messages may be used in the above explained scenarios:

1. Message for propagating the NFC capabilities of the electronic device; optionally with an extension that indicates the registration functionality.
2. Message for transporting an "electronic device rejected" event to inform other electronic devices in the same network that an electronic device with NFC capabilities is already active in this network as NFC TouchPoint.
3. Message for transporting a "read tag" command with optional information about the tag to be read (can be shown to the end user) and message with the corresponding response.
4. Message for transporting an event "tag data" that contains information about a tag that was read and the content of the tag.
5. Message for transporting a "register" command (carrying information about the registering device and/or the tag technology the device is interested in) and message with the corresponding response.

The messages are exchanged via the network. The kind of network is generally not essential for the present disclosure as long as data can be exchanged reliably. In existing IP networks, typically TCP or UDP will be used. Although other protocols may exist or can be developed, several requirements are solved already by UPNP, and the required messages can be exchanged using the UPNP framework. Thus, device addressing, capability broadcasting/communicating etc. can be done by using UPNP. In addition, UPNP might be available on the devices already today due to DLNA, which is also based on UPNP.

In practical situations there may be more than on electronic device with NFC capabilities within a network. Preferably, there shall be just one such electronic device active as TouchPoint at a given time since the end user may be very confused and does not know anymore where to touch in case of multiple active TouchPoints. The following approach is preferably followed: A device propagates its NFC capabilities. If there is no answer from any device, the current electronic device becomes the active TouchPoint. If there is already an active TouchPoint, this active TouchPoint shall send a "rejected" event.

If the network is down when touching then electronic device with an NFC device, e.g. an NFC tag, the electronic device (i.e. the TouchPoint) can either buffer the information in the buffer 16 or discard it. In either case the user shall be informed via the user interface 15. The applied approach is generally implementation dependent.

In case the electronic device (i.e. the TouchPoint) supports the "registration" functionality as described above with reference to FIGS. 4 to 6, there may be the case where different network devices register at the TouchPoint for the same type of tag. In the response to the register request the TouchPoint shall indicate whether it rejects the registration due to conflict or whether it accepted it. In case an NFC tag is touched with an application type for which more than one registration exists, the end user shall choose to where the data shall be processed. For instance, with reference to FIG. 4, if both the TV set 20a and the laptop 20b registered for the use of voucher tags, the user may be informed via the user interface if such a voucher tag is touched, if the voucher shall be sent to the TV set 20a or the laptop 20b.

In summary, network devices without active NFC capabilities can use an electronic device that offers its NFC (reader/writer) capabilities to other network devices through the network. No hardware modification of the network devices is required. A software update can add such functionality even to older already delivered network devices. This makes it possible to "NFC-enable" older network devices easily and offers a means to overcome the limited deployment of NFC in the market today.

Thus, the foregoing discussion discloses and describes merely exemplary embodiments of the present disclosure. As will be understood by those skilled in the art, the present disclosure may be embodied in other specific forms without departing from the spirit or essential characteristics thereof. Accordingly, the disclosure of the present disclosure is intended to be illustrative, but not limiting of the scope of the disclosure, as well as other claims. The disclosure, including any readily discernible variants of the teachings herein, defines, in part, the scope of the foregoing claim terminology such that no inventive subject matter is dedicated to the public.

In the claims, the word "comprising" does not exclude other elements or steps, and the indefinite article "a" or "an" does not exclude a plurality. A single element or other unit may fulfill the functions of several items recited in the claims. The mere fact that certain measures are recited in mutually different dependent claims does not indicate that a combination of these measures cannot be used to advantage.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure. Further, such a software may also be distributed in other forms, such as via the Internet or other wired or wireless telecommunication systems.

The elements of the disclosed devices, apparatus and systems may be implemented by corresponding hardware and/or software elements, for instance appropriated circuits. A circuit is a structural assemblage of electronic components including conventional circuit elements, integrated circuits including application specific integrated circuits, standard integrated circuits, application specific standard products, and field programmable gate arrays. Further a circuit includes central processing units, graphics processing units, and microprocessors which are programmed or configured according to software code. A circuit does not include pure software, although a circuit includes the above-described hardware executing software.

It follows a list of further embodiments of the disclosed subject matter:
1. An electronic device including
    an NFC unit configured to enable near field communication, NFC, communication with at least one NFC device,
    a network communication unit configured to communicate with at least one network device,
    a controller configured to control the NFC unit and the network communication unit to exchange data between the at least one NFC device and the at least one network device.
2. The electronic device as defined in embodiment 1,
wherein said network communication unit is configured to broadcast the NFC functionality of the device to selected or all network devices.
3. The electronic device as defined in any preceding embodiment,
wherein said controller is configured to control the NFC unit and the network communication unit to exchange data between the at least one NFC device and the at least one network device on request of the network device.
4. The electronic device as defined in any preceding embodiment,
    further including a registration unit configured to enable network devices to register for data exchange with one or more NFC devices, types of NFC devices and/or data carried by NFC devices.
5. The electronic device as defined in embodiment 4,
wherein said controller is configured to check, once an NFC device is read by the NFC unit, if there is a registration for said NFC device, said type of NFC device and/or the data carried by said NFC device at the registration unit, and, if this is the case, to exchange data between said NFC device and the one or more network devices, which made said registration.
6. The electronic device as defined in any preceding embodiment,
wherein said NFC unit is configured to read data from NFC devices.
7. The electronic device as defined in any preceding embodiment,
    further including a user interface configured to provide requests or information to the user.
8. The electronic device as defined in embodiment 7,
wherein said user interface is configured to provide a request to the user to read a particular NFC device or a particular type of NFC device, or to provide a confirmation or indication of the data read and/or information about the requesting network device to the user.
9. The electronic device as defined in any preceding embodiment,
wherein said network communication unit is configured to communicate via a wired or wireless IP network or a communications network.
10. The electronic device as defined in embodiment 2,
wherein said network communication unit is configured to check if it receives a response from another NFC device within the same network, that has already offered its NFC functionality to the network devices, wherein said controller is configured to control the NFC unit and the network communication unit to exchange data between an NFC device and a network device only in the absence of such a response.
11. The electronic device as defined in any preceding embodiment,
wherein said network communication unit is configured to respond to a broadcast from another NFC device offering its NFC functionality to exchange data between an NFC device and a network device that it has already earlier offered its NFC functionality to the network devices.
12. The electronic device as defined in embodiment 7,
wherein said network communication unit is configured to check if the network is enabled and the NFC device is connected to the network and
wherein said user interface is configured to provide a corresponding information to the user if the network is disabled and/or the NFC device is disconnected from the network when data are read from an NFC device.
13. The electronic device as defined in any preceding embodiment 2,
    further including a buffer configured to buffer data read from an NFC device while the network is disabled and/or the NFC device is disconnected from the network.
14. The electronic device as defined in embodiment 4,
wherein said controller is configured to check, once a request for registration is received from a network device, if the same registration has already been made for a different network device, and either to accept the request for registration, or to reject the request for registration or to issue a request for decision by the user via a user interface.

15. The electronic device as defined in embodiment 4, wherein said controller is configured to check, once an NFC device is read by the NFC unit, if there are two or more registrations for said NFC device, said type of NFC device and/or the data carried by said NFC device at the registration unit, and, if this is the case, to issue a request for decision by the user via a user interface with which of the registered network device data shall be exchanged with said NFC device.

16. The electronic device as defined in any preceding embodiment,
wherein said NFC device is a mobile phone, smartphone, laptop, PDA, tablet PC, camera, remote control, portable media player, headset, headphone or wireless speaker.

17. Near field communication, NFC, method including
enabling NFC communication with at least one NFC device,
communicating with at least one network device,
controlling the NFC communication and the network communication to exchange data between the at least one NFC device and the at least one network device.

18. Network device including
a network communication unit configured to communicate with other network devices,
a controller configured to control the network communication unit to request an electronic device, which has a network communication unit and which is configured to enable NFC communication with at least one NFC device, to exchange data between at least one NFC device and at least one network device and/or to register at such an electronic device for data exchange with one or more NFC devices, types of NFC devices and/or data carried by NFC devices.

19. Network communication method including
communicating with other network devices,
controlling the communication to request an electronic device, which has a network communication unit and which is configured to enable NFC communication with at least one NFC device, to exchange data between at least one NFC device and at least one network device and/or to register at such an electronic device for data exchange with one or more NFC devices, types of NFC devices and/or data carried by NFC devices.

20. A non-transitory computer-readable recording medium that stores therein a computer program product, which, when executed by a processor, causes the method according to embodiment 17 or 19 to be performed.

21. A computer program including program code means for causing a computer to perform the steps of said method according to embodiment 17 or 19 when said computer program is carried out on a computer.

The invention claimed is:

1. An electronic device, comprising:
near field communication (NFC) circuitry configured to enable NFC communication with an NFC device;
network communication circuitry configured to communicate through a wireless local network connection; and
controller circuitry configured to:
in response to the network communication circuitry receiving a request through the wireless local network connection from a network device in local proximity to the electronic device and the request being to use NFC functionality of the NFC device, control the NFC circuitry to read data from the NFC device, wherein the data indicates the NFC functionality and the network device having transmitted the request via the wireless local area connection; and
control the network communication circuitry to transmit, through the wireless local network connection, the NFC functionality of the NFC device to the network device.

2. The electronic device as claimed in claim 1, wherein said network communication circuitry is configured to broadcast the NFC functionality of the electronic device to a selected device or to all network devices via the wireless local network connection.

3. The electronic device as claimed in claim 2, wherein said network communication circuitry is configured to check if a response is received from another NFC device within a same network, that has already offered NFC functionality to the network device, and
said controller circuitry is configured to control the NFC circuitry and the network communication circuitry to exchange data between the NFC device and the network device only in the absence of such a response.

4. The electronic device as claimed in claim 1, wherein said controller circuitry is configured to control the NFC circuitry and the network communication circuitry to exchange data between the NFC device and the network device on request of the network device.

5. The electronic device as claimed in claim 1, further comprising registration circuitry configured to enable network devices to register for data exchange with one or more NFC devices, types of NFC devices and/or data carried by NFC devices.

6. The electronic device as claim 5, wherein said controller circuitry is configured to check, once the NFC device is read by the NFC circuitry, if there is a registration for said NFC device, a type of the NFC device and/or data carried by said NFC device at the registration circuitry, and, if this is the case, to exchange the data between said NFC device and the network device which made said registration.

7. The electronic device as claimed in claim 5, wherein said controller circuitry is configured to check, once a request for registration is received from a first network device, if the same registration has already been made for a different network device, and either to accept the request for registration, or to reject the request for registration or to issue a request for decision by the user via a user interface.

8. The electronic device as claimed in claim 5, wherein said controller circuitry is configured to check, once an NFC device is read by the NFC circuitry, if there are two or more registrations for said NFC device, said type of NFC device and/or the data carried by said NFC device at the registration circuitry, and, if this is the case, to issue a request for decision by the user via a user interface with which of the registered network device data shall be exchanged with said NFC device.

9. The electronic device as claimed in claim 1, further comprising a user interface configured to provide requests or information to a user.

10. The electronic device as claimed in claim 9, wherein said user interface is configured to provide a request to the user to read a particular NFC device or a particular type of NFC device, or to provide a confirmation or indication of the data read and/or information about the requesting network device to the user, in order to provide the NFC functionality to the network device.

11. The electronic device as claimed in claim 9, wherein
said network communication circuitry is configured to check if the network is enabled and the NFC device is connected to the network, and
said user interface is configured to provide a corresponding information to the user if the network is disabled and/or the NFC device is disconnected from the network when data are read from an NFC device.

12. The electronic device as claimed in claim 11, further comprising a buffer configured to buffer data read from an NFC device while the network is disabled and/or the NFC device is disconnected from the network.

13. The electronic device as claimed in claim 1, wherein said network communication circuitry is configured to communicate via a wired or wireless IP network or a communications network.

14. The electronic device as claimed in claim 1, wherein said network communication circuitry is configured to respond to a broadcast from another NFC device offering NFC functionality to exchange data between an NFC device and a first network device that it has already earlier offered its NFC functionality to the network devices.

15. The electronic device as claimed in claim 1, wherein said NFC device is a mobile phone, smartphone, laptop, PDA, tablet PC, camera, remote control, portable media player, headset, headphone or wireless speaker.

16. A near field communication (NFC) method, comprising:
receiving, by an electronic device, a request through a wireless local network connection from a network device in local proximity to the electronic device, the request to use NFC functionality of an NFC device;
performing, in response to receiving the request, NFC communication between the electronic device and the NFC device so that the electronic device reads data from the NFC device that indicates the NFC functionality of the NFC device; and
transmitting, by the electronic device through the wireless local network connection, the NFC functionality of the NFC device to the network device.

17. A network device, comprising:
network communication circuitry configured to communicate with other network devices through a wireless local network connection; and
controller circuitry configured to control the network communication circuitry to:
transmit a request, through to the wireless local network connection to an electronic device in local proximity to the network device, to use near field communication (NFC) functionality of an NFC device;
receive, from the electronic device through the wireless local network connection, the NFC functionality of the NFC device; and
operate in accordance with the NFC functionality which lave been received, wherein
the electronic device reads, in response to the request, data from the NFC device, the data indicating the NFC functionality of the NFC device.

18. A non-transitory computer-readable recording medium that stores therein a computer program product, which, when executed by a processor of an electronic device, causes the processor to perform a method comprising:
receiving a request through a wireless local network connection from a network device in local proximity to the electronic device, the request to use NFC functionality of an NFC device;
performing, in response to receiving the request, NFC communication between the electronic device and the NFC device so that the electronic device reads data from the NFC device that indicates the NFC functionality of the NFC device; and
transmitting, through the wireless local network connection, the NFC functionality of the NFC device to the network device.

* * * * *